Figure 1:
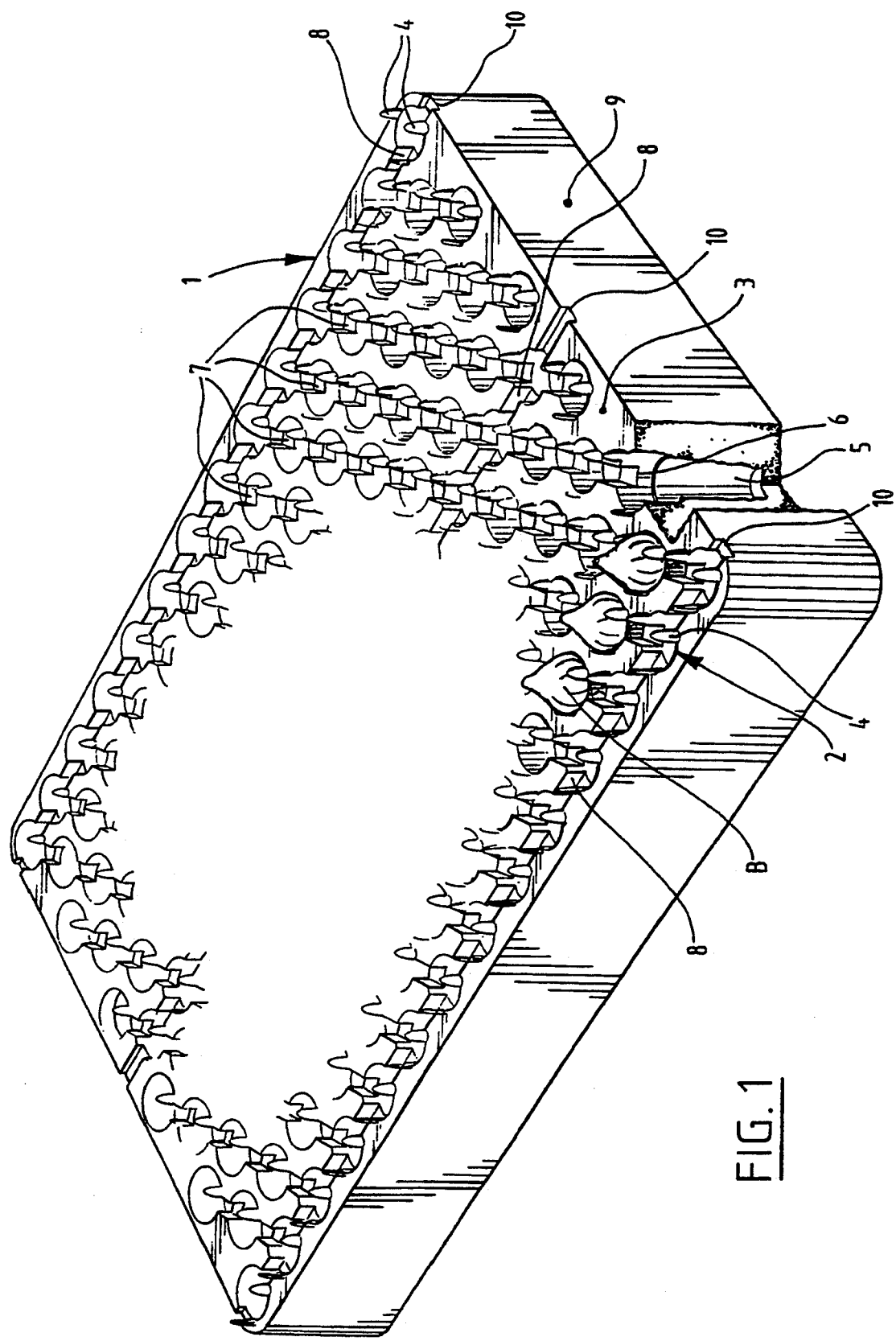

United States Patent [19]
Beljaars

[11] Patent Number: 5,379,550
[45] Date of Patent: Jan. 10, 1995

[54] CARRIER FOR BULBOUS PLANTS

[75] Inventor: Johannes M. W. Beljaars, Gilze, Netherlands

[73] Assignee: Curtec Nederland B.V., Rijen, Netherlands

[21] Appl. No.: 45,520

[22] Filed: Apr. 6, 1993

[30] Foreign Application Priority Data

Apr. 6, 1992 [NL] Netherlands .................. 9200641

[51] Int. Cl.$^6$ ............................................. A01G 9/02
[52] U.S. Cl. ............................................. 47/87; 47/86
[58] Field of Search ...................... 47/86, 87, 56

[56] References Cited

U.S. PATENT DOCUMENTS

| | | |
|---|---|---|
| 3,032,927 | 5/1962 | Kobs . |
| 3,386,608 | 6/1968 | Diller ........................ 47/86 |
| 3,889,416 | 7/1975 | Bergeron et al. ......... 47/86 |
| 4,111,585 | 9/1978 | Mascaro .................... 47/86 |
| 4,242,834 | 1/1981 | Olsen ......................... 47/86 |
| 4,495,725 | 1/1985 | Talbott . |

FOREIGN PATENT DOCUMENTS

| | | | |
|---|---|---|---|
| 2318187 | 11/1974 | Germany ................... 47/87 |
| 3427704 | 1/1986 | Germany ................... 47/87 |
| 3712867 | 11/1988 | Germany ................... 47/86 |
| 7713224 | 6/1979 | Netherlands ............... 47/86 |
| 1020945 | 2/1966 | United Kingdom . |
| 2007952 | 5/1979 | United Kingdom ....... 47/86 |
| 2074433 | 11/1981 | United Kingdom ....... 47/87 |

Primary Examiner—Ramon S. Britts
Assistant Examiner—Joanne C. Downs
Attorney, Agent, or Firm—Wegner, Cantor, Mueller & Player

[57] ABSTRACT

A carrier for bulbous plants on which the bulbs are disposed mutually adjacently according to a predetermined pattern, comprising a number of individual bulb holders for each bulb which are disposed in that pattern on the carrier, in addition to a liquid reservoir which belongs to each or a number of holders and which in use lies under the holders, wherein the or each liquid reservoir is provided with an overflow edge for defining the maximum liquid level in the reservoir.

In preference the bulb holders are provided with fixation means for fixing the bulb.

The fixation means are usually formed by protrusions, for instance pins, onto which the bulb is fixed.

It is thus possible to keep constant the distance between the underside of the bulb and the water level, and use no longer has to be made of culture material and sand.

7 Claims, 3 Drawing Sheets

CARRIER FOR BULBOUS PLANTS

The invention relates to a carrier for bulbous plants on which the bulbs are disposed mutually adjacently according to a predetermined pattern.

A carrier of the type described in the preamble is intended for the forcing of bulbs disposed very closely to each other, for which purpose the bulbs are placed in culture material which is held by a dish-like carrier. After the bulb has flowered the flowers are harvested, usually with the bulb. A drawback to a culture method on such a carrier is that the roots of the bulbs become mutually entangled whereby the bulbs are no longer easily removable one at a time and that much heavy manual work is required. The use of culture material further usually requires the application of pesticides and herbicides, which is less desirable from an environmental point of view.

To prevent the bulbs from growing upward, use is made of sand.

The invention has for its object to provide a carrier wherein the above stated drawbacks are obviated, which carrier is distinguished in that it is provided with a number of individual bulb holders for each bulb which are disposed in that pattern on the carrier, in addition to a liquid reservoir which belongs to each or a number of holders and which in use lies under the holders, wherein the or each liquid reservoir is provided with an overflow edge for defining the maximum liquid level in the reservoir.

With such a carrier the use of culture material and the associated environmental drawbacks are eliminated and it is moreover no longer necessary to use sand to hold the bulbs in place, this function being taken over by the bulb holder. Each or all liquid reservoirs are filled simultaneously and empty automatically to the desired liquid level due to the overflow edge which is arranged at a determined distance under the holder.

Should use be made herein of a liquid reservoir arranged at each bulb holder a maximum separation of the roots is then ensured, thus resulting in as little entanglement as possible between adjacently arranged bulbs.

Should more than one liquid reservoir be used in the carrier it is then recommended to connect the overflow edge of each reservoir to a collective liquid feed and drain system in the carrier. Herewith the liquid reservoirs can be filled simultaneously and the desired level remains preserved by the collective drain system of the liquid.

A possible embodiment is the arrangement of channels in the top surface of the carrier which extend below the bulb holders. These channels connect the reservoirs and can be used to feed liquid thereto and drain liquid therefrom.

In order to enable firm fixing of the bulbs onto the holders the latter are provided with fixation means.

The carrier is simple to manufacture if it is made of plastic, for instance by vacuum-forming, or is made from foam. In preference the carrier is embodied as an injection moulded article.

Figure 2:
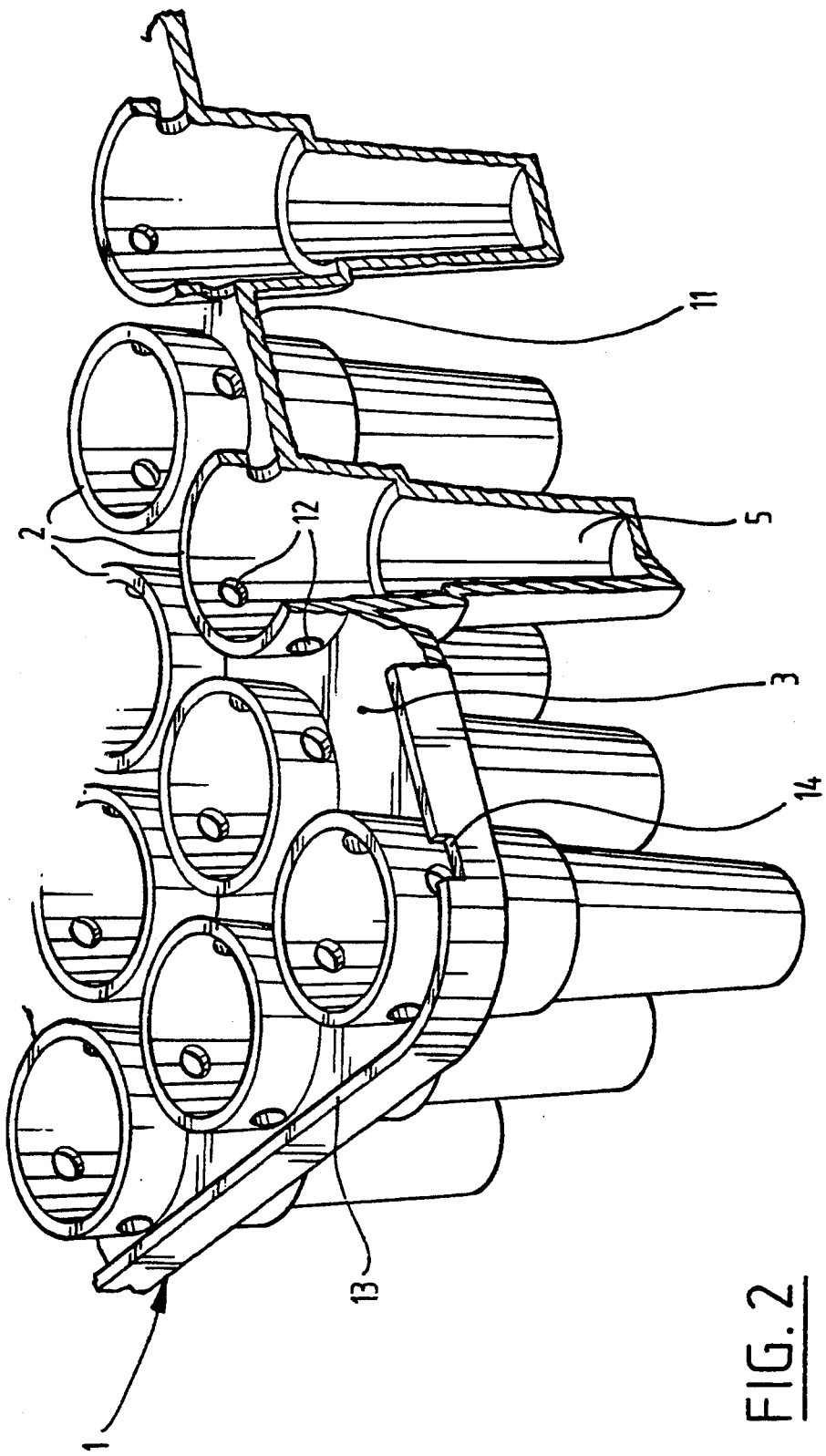
Figure 3:
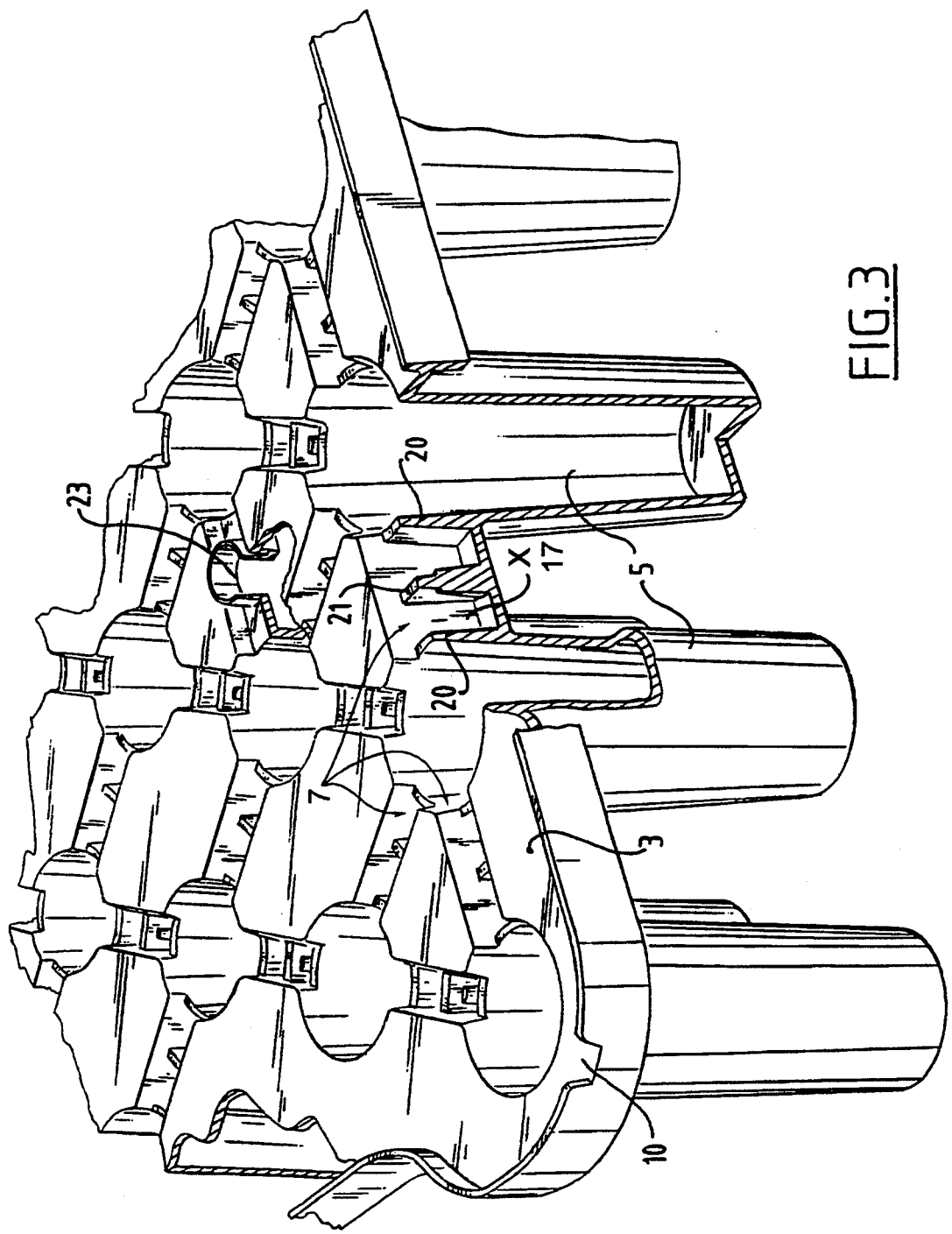

Above mentioned and other features are further elucidated in the figure description hereinbelow of two embodiments. In the drawing:

FIG. 1 shows a perspective top view of a carrier according to the invention in a first embodiment, FIG. 2 shows on enlarged scale a perspective view corresponding with FIG. 1 of a detail of a carrier in the second embodiment, FIG. 3 shows on enlarged scale a perspective view corresponding with FIG. 2 of a detail of a carrier in the third embodiment.

Designated with the numeral 1 in FIG. 1 is the carrier according to the invention, on the upper side of which a group of bulbs B is disposed in accordance with a particular pattern for the purpose of forcing them. In the embodiment shown each bulb is placed on a bulb holder 2 which is formed by the upper surface 3 of carrier 1 and upward protruding members 4. Three fixation members 4 are arranged per holder 2 but the number can of course vary within the scope of the invention. The fixation members may be embodied like pins upon which the bulb is pinned, said pins being sticked into the bulb, so holding the bulb in a positive way.

Depending on the type of bulb which has to be forced, the fixation means are formed by a sharp pin onto which the bulb can be placed or by a clamp which grips round the bulb, see FIG. 1.

Arranged below each holder 2 is a reservoir 5 which is a recess in the carrier 1. The size and volume of reservoir 5 can be chosen at random but has to be such that a sufficient quantity of liquid is present for a determined time to enable feeding of the bulb. The shape of the supply reservoir 5 is further determined by the quantity of roots which will develop under bulb B. These grow into the reservoir 5, wherein entanglement of the roots of adjacent bulbs must be prevented as far as possible.

The fixation means serve to hold the bulb in place counter to the upward oriented pressure on the bulb as a result of root growth and also to prevent the bulbs and plants tipping over or growing askew.

It is of great importance that the distance between the underside of the bulb and the water level is fixed within limits. Rot could occur if the bulb is too deep in the water, while the growth of the roots is unsatisfactory if the distance between the underside of the bulb and the water is too great.

According to a preferred embodiment the fixation means are adapted to locate the bulb, such that it extends over a distance of for instance 3 mm in the water.

A particular feature of the invention is that each liquid reservoir 5 is provided with an overflow edge 6 which here lies recessed in relation to the upper surface 3 of carrier 1. This overflow edge 6 connects onto a channel 7 which communicates with the overflow edges of all reservoirs 5. The channel system that is formed here by channels 7 running at an angle relative to the front edge of the carrier 1 is intersected by longitudinal channels 8 which debouch in the front wall 9 of the carrier. Channel 8 has an overflow edge 10 so that excess water which is distributed for instance by spraying over the carrier 1 can run away via channels 7 and 8, which liquid leaves the carrier 1 via the overflow edges 10.

After the bulbs have been brought to flower they can either be removed as a whole without the roots of adjacent bulbs having to be disentangled, or the flowers can be removed therefrom.

Used bulbs can also be more easily removed from the carrier, whereby it can be used again.

It will be apparent that this method involves water culture, wherein no use is made of culture material or sand. The liquid fed to the carrier 1 for the growth of the root system consists of water optionally supplemented with additives.

FIG. 2 shows an embodiment, this being a detail of a complete carrier as shown in FIG. 1.

In FIG. 2 the same reference numerals are used for the same components.

It can be seen clearly from the figure that here the carrier is constructed from thin-walled material, for instance of plastic, wherein each liquid reservoir 5 is a closed pan widening towards the top, wherein the wall of the carrier continues as the bulb holder 2. Here the bulb is placed on the top edge of holder 2, which edge may optionally be provided with receiving or upward protruding members 4 as shown in FIG. 1. The supply reservoirs 5 are mutually joined by a horizontally extending dividing wall 11, whereof the upper surface 3 has the function of a connecting system for feed and drain of the liquid in the reservoirs 5. Each reservoir is namely provided with an overflow edge in the form of a continuous hole 12 in the side wall of the circular bulb holder 2, wherein the lower edge of the hole 12 lies flush with the upper surface 3 of dividing wall 11. The wall 11 is bordered by an upward standing edge 13 provided at one or more locations with a recess 14, the bottom edge of which protrudes slightly above the surface 3 of wall 11.

Although the above embodiment relates to closed reservoirs, it is possible to apply reservoirs opened on the underside. All reservoirs are then mutually connected for instance on their underside, thus in fact forming a large reservoir. This large reservoir can be formed by a separate tray.

The water can be supplied here by spraying it over the carrier 1 or by filling the space above wall 11 with water. The water flows via the holes 12 into the water reservoirs 5 until the level of the lower edge of the holes 12 is reached. Excess water can flow away via the opening 14. In this embodiment also the configuration of the channels can be used as according to the above described embodiment not shown in the drawing.

The operation of the carrier corresponds with the operation described with reference to the carrier of FIG. 1. The carrier otherwise takes a nestable form.

The carriers can be manufactured of appropriate material, for instance plastic, wherein the carrier 1 can be formed by a full-walled body or a thin-walled construction as shown in FIG. 2. Herein the different elements such as bulb holder and reservoir with connecting wall or body are preferably manufactured in integral form. The bulb holders can nevertheless also be embodied as separate add-on pieces.

According to another embodiment shown in FIG. 3, wherein the same reference numerals are used for the same components, adjacent liquid reservoirs 5 are mutually connected by means of channels. In this situation draining channels 7 are arranged per group of liquid reservoirs. These channels likewise mutually connecting two adjacent liquid reservoirs are each joined in the middle with a downward extending drainage channel 17. Arranged on either side of the connection of the drainage channel 17 onto the draining channels 7 are thresholds 20 which determine the liquid level in the channels, and thus in the reservoirs 5.

In draining channels 7 a third threshold 21 is provided, the height of which can be lower or higher than that of the threshold 20.

The function of said threshold 21 is to prevent an entanglement of the roots of adjacent bulbs, so making it easier to remove the bulbs after having raised the flowers. The liquid level in the reservoirs 5 is normally brought on the height of the top edge of each threshold 20. By spraying the total tray on the top surface 3 the liquid will spread out and the initial level will be determined by the overflow edge 10. To drain off excess water in a more rapid way more openings 23 can be provided in the top surface 3 of the tray.

Although it is not shown, it is clear that the protruding pins 4 can be provided along the circumference of each reservoir 5 in order to be able to pin the bulbs and to hold them in a more positive way, like is described in the previous description of the embodiment according to FIG. 1. Such pins can be integral with the plastic formed embodiment of FIGS. 2 and 3, but within the scope of the invention the pins can be placed afterwards as a separate element.

I claim:

1. In a plant starting carrier receptacle for a plurality of plants, said receptacle having a plurality of pockets and each of said pockets being provided for starting a corresponding one of said plants, the improvement comprising:

each of said pockets, with a closed bottom portion and an open top portion, providing a reservoir for receiving a liquid medium in which roots of an individual plant can grow;

holding means, associated with each said top portion, for engaging and supporting a bulb of said plant over said reservoir with a bottom of said bulb at a preferred depth in said liquid medium;

overflow means for defining a maximum level of said liquid medium within said reservoir.

2. The improvement as in claim 1, wherein each said holding means comprises:

means for gripping and clamping said bulb firmly at said preferred height.

3. The improvement as in claim 1, wherein each said holding means comprises:

means for piercing said bulb in order to fix said bulb firmly at said preferred height.

4. The improvement as in claim 3, wherein said piercing means comprises sharp pins.

5. The improvement as in claim 1, and said receptacle further comprising:

a feed and drain means for feeding said liquid medium to all of said reservoirs simultaneously and levelly.

6. The improvement as in claim 5, wherein said feed and drain means comprises:

recessed channels in a top surface of said receptacle; and said overflow means of each of said reservoirs being interconnected via said recessed channels.

7. The improvement as in claim 1, in which each said receptacle is nestable within another said receptacle.

* * * * *